US008878655B2

(12) United States Patent
Sormunen (10) Patent No.: US 8,878,655 B2
(45) Date of Patent: Nov. 4, 2014

(54) VIBRATION MECHANISM FOR USER INTERFACE MODULE

(75) Inventor: Jouko Antero Sormunen, Kiviniemi (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 12/773,460

(22) Filed: May 4, 2010

(65) Prior Publication Data

US 2011/0276878 A1      Nov. 10, 2011

(51) Int. Cl.
*H04B 3/36* (2006.01)
*G06F 3/0354* (2013.01)
*G06F 3/01* (2006.01)

(52) U.S. Cl.
CPC .......... *G06F 3/016* (2013.01); *G06F 3/03547* (2013.01)
USPC ................. 340/407.1; 340/407.2; 340/12.54; 340/12.55; 340/13.24; 340/13.31; 345/156; 345/168; 345/173; 345/175; 345/179

(58) Field of Classification Search
CPC ......... G08B 6/00; G06F 3/016; G06F 3/0488; G06F 3/04883; G06F 3/044; G06F 3/04886; G06F 3/045; G06F 3/011; G06F 3/038; G06F 3/03543; G06F 3/0338; G09B 21/003; H04M 19/047; H04M 19/04
USPC .......... 340/407.1, 407.2, 12.54, 12.55, 13.24, 340/13.31, 23.32; 345/156, 157, 158, 168, 345/173, 175, 179; 455/556.2, 566, 567, 455/575.1; 116/205; 310/80, 81
See application file for complete search history.

(56) References Cited

U.S. PATENT DOCUMENTS

| 6,271,610 | B1 | 8/2001 | Ibata et al. |
| 7,230,605 | B2 * | 6/2007 | Rekimoto et al. ............. 345/158 |
| 2003/0003962 | A1 * | 1/2003 | Vooi-Kia et al. .............. 455/566 |
| 2004/0067780 | A1 * | 4/2004 | Eiden ............................ 455/567 |
| 2006/0052143 | A9 * | 3/2006 | Tuovinen .................... 455/575.1 |
| 2007/0035527 | A1 | 2/2007 | Cheon et al. |
| 2009/0176534 | A1 | 7/2009 | Lee et al. |
| 2010/0013613 | A1 | 1/2010 | Weston |
| 2010/0052578 | A1 | 3/2010 | Kim |
| 2010/0090814 | A1 | 4/2010 | Cybart et al. |

OTHER PUBLICATIONS

International Search Report of International Application No. PCT/FI2011/050337—Date of Completion of Search: Aug. 23, 2011, 4 pages.
Written Opinion of the International Searching Authority of International Application No. PCT/FI2011/050337—Date of Completion of Opinion: Aug. 23, 2011, 6 pages.

* cited by examiner

*Primary Examiner* — Steven Lim
*Assistant Examiner* — Sisay Yacob
(74) *Attorney, Agent, or Firm* — Locke Lord LLP (57) ABSTRACT

An apparatus including: a user interface module, a vibration mechanism configured to move the user interface module to provide a tactile effect through the user interface module, and a counterbalancing element configured to provide a counterbalancing effect for movements of the user interface module.

15 Claims, 7 Drawing Sheets

VIBRATION MECHANISM FOR USER INTERFACE MODULE

TECHNICAL FIELD

The present invention generally relates to vibration mechanisms in electronic apparatuses and more particularly, but not exclusively to providing localized vibration effect.

BACKGROUND ART

Vibration can be used in electronic apparatuses such as mobile phones to provide haptic feedback to a user of the apparatus. Some actuators are used to shake the whole device (for example vibra motor, linear vibras) and some other types (for example piezos) can be used to push or pull some part of the device.

SUMMARY

According to a first example aspect of the invention there is provided an apparatus comprising:
a user interface module,
a vibration mechanism configured to move the user interface module to provide a tactile effect through the user interface module, and
a counterbalancing element configured to provide a counterbalancing effect for movements of the user interface module.

According to a second example aspect of the invention there is provided a method comprising:
providing a tactile effect through a user interface module of an apparatus by vibrating the user interface module, and
providing a counterbalancing effect for vibrating movements of the user interface module by causing movements of a counterbalancing element.

According to a third example aspect of the invention there is provided a computer program comprising computer executable program code which, when executed by at least one processor of an apparatus, causes the apparatus to perform:
providing a tactile effect through a user interface module of the apparatus by vibrating the user interface module, and
providing a counterbalancing effect for movements of the user interface module by moving a counterbalancing element.

According to yet another example aspect of the invention there is provided a memory medium carrying the computer program of the third example aspect.

According to a still another example aspect of the invention there is provided an apparatus comprising:
user interface means,
vibration means configured to move the user interface means to provide a tactile effect through the user interface means, and
counterbalancing means configured to provide a counterbalancing effect for movements of the user interface means.

Different non-binding example aspects of the present invention have been illustrated in the foregoing.

BRIEF DESCRIPTION OF THE DRAWINGS

The invention will be described, by way of example only, with reference to the accompanying drawings, in which.

DETAILED DESCRIPTION

Reference in the specification to "one embodiment" or "an embodiment" or "an example embodiment" means that a particular feature, structure, or characteristic described in connection with the embodiment is included in at least one embodiment of the invention. The appearances of the phrase "in an embodiment" in various places in the specification are not necessarily all referring to the same embodiment, nor are separate or alternative embodiments mutually exclusive of other embodiments.

In an example embodiment of the invention tactile feedback is given to a user of an apparatus through a display module of the apparatus. In an example, the display module is a touch screen and the user is given tactile feedback by moving the touch screen when the user touches the touch screen. Given that the apparatus is a handheld apparatus and the user is holding the apparatus in one hand and touching the touch screen with the other hand, it is preferable that the user feels the feedback on the touching hand and at least not so much on the hand which is holding the apparatus.

When one tries to move an element, one needs a base or a support in relation to what to push the element. In case of a handheld apparatus, this base may a chassis of the apparatus and components which are connected to the chassis. If one does not want the chassis to move, the mass ratio between the chassis and the element that is moved should be relatively large, i.e. the chassis should be heavier than the element that is moved. That is, the mass ratio between "where to push" and "what to move" should be large enough. If one tries to move a display module of a mobile device (or other handheld apparatus) the mass ratio between the display module and the chassis of the mobile device may be too small for example if the display module is relatively large in relation to the size of the apparatus. Due to the poor mass ratio also the chassis is likely to move when the display module is moved. This causes that the user of the mobile device may feel too much tactile feedback on the holding hand and not only on the touching hand. One could make the chassis heavier, but this would increase weight of the apparatus and that is not always desirable. Thus, there is a need to consider other options.

In an example embodiment of the invention, when a display module of an apparatus is moved to provide tactile effect or tactile feedback, a counterbalancing movement of a mass is caused into opposite direction to prevent movement of a chassis of the apparatus. That is, a pair of mass elements, which move to opposite directions, is provided. The masses moving to opposite directions cancel out each other's effect and thereby the chassis of the apparatus does not move so much anymore. For example a display module and a battery may form such mass pair.

In an example embodiment of the invention, the elements of the mass pair are operatively connected to each other so that when one of the elements is moved to one direction, the other one automatically moves to an opposite direction. For example actuator(s) may connect the elements of the mass pair to each other. In an example embodiment of the invention, the elements of the mass pair are connected to a chassis of the apparatus so that they can freely move to the desired direction to provide the haptic effect/feedback and the counterbalancing movement. In an example embodiment of the invention, if masses of the elements of the mass pair are not equal, dimensions of one of the elements may be changed to make the weights of the elements equal or additional weight components may be used to balance the weights. Alternatively, a difference in weights of the elements may be compensated by moving the lighter element more that the heavier element.

An apparatus of an example embodiment of the invention comprises a user interface module, a vibration mechanism, which is configured to move the user interface module to provide a tactile effect to a user of the apparatus through the user interface module, and a counterbalancing element, which is configured to provide a counterbalancing effect for movements of the user interface module. The tactile effect may be feedback to something the that user does or some other effect. A user action does not necessarily precede the tactile effect that is provided. That is, the effect may be provided without requiring user actions.

In an example embodiment of the invention the vibration mechanism and the counterbalancing element are integrated into the user interface module.

In an example embodiment of the invention the user interface module is a display.

In an example embodiment of the invention the counterbalancing element is a battery. A battery is well suited for acting as a counterbalancing element as battery is a relatively large and heavy component that is anyway needed in many handheld apparatuses. In another embodiment the counterbalancing element is a second display. If there are two (or more) displays, the displays can be used to counterbalance movements of each other. In yet another embodiment the counterbalancing element is a counter weight.

In an example embodiment of the invention the counterbalancing element is configured to move to an opposite direction relative to a movement of the user interface module.

In an example embodiment of the invention the vibration mechanism comprises one or more piezo actuators and/or one or more spring structures.

In an example embodiment of the invention the counterbalancing element and the user interface module are mechanically connected to each other.

In an example embodiment of the invention a movement of the user interface module to a first direction is configured to cause movement of the counterbalancing element to a second direction, wherein the first direction and the second direction are opposite directions. Alternatively, a movement of the counterbalancing element to a first direction may be configured to cause movement of the user interface module to a second direction.

In an example embodiment of the invention the vibration mechanism is configured to move the counterbalancing element to provide the counterbalancing effect.

In an example embodiment of the invention the vibration mechanism is configured to push the user interface module to a first direction and the counterbalancing element to a second direction, wherein the first direction and the second direction are opposite directions.

In an example embodiment of the invention the user interface module and the counterbalancing element are of same weight and move the same amount. In another example embodiment of the invention weights of the user interface module and the counterbalancing element are different and lighter component of the user interface module and the counterbalancing element is configured to move more than the other component in order to compensate the difference in weight. In this way momentum of both movements may be made equal.

Figure 1A:
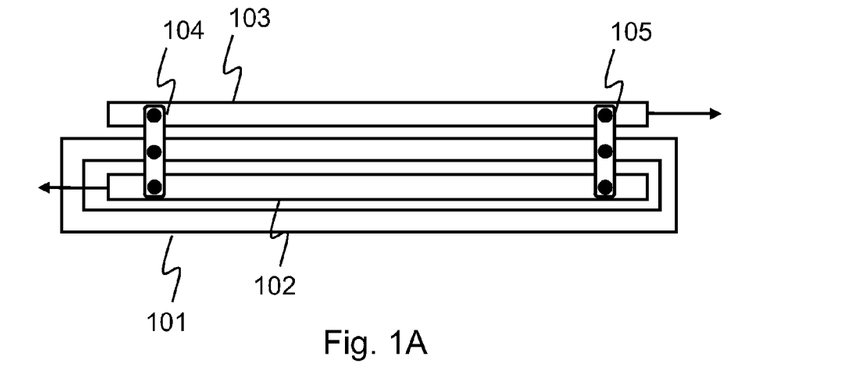
FIGS. 1A and 1B show examples of apparatuses of certain embodiments of the invention.
Figure 1B:
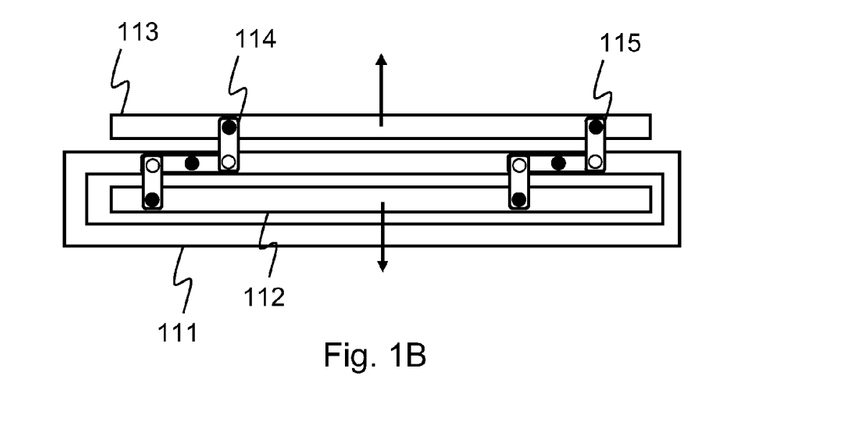

FIGS. 1A and 1B show examples of apparatuses of certain embodiments of the invention. The apparatus of FIG. 1A comprises a support structure 101 (e.g. apparatus chassis), a display 103, a battery 102, and actuators 104 and 105. The actuators 104, 105 are configured to move the display 103 the battery 102 horizontally into opposite directions. The movements are illustrated by arrows.

In an example embodiment of the invention the display 103 and the battery 102 are moved in X-direction (along a longer side of the apparatus in case of an apparatus having a square form). Alternatively the movement may be in Y-direction (along a shorter side of the apparatus in case of an apparatus having a square form).

The apparatus of FIG. 1B comprises a support structure 111 (e.g. apparatus chassis), a display 113, a battery 112, and actuators 114 and 115. The actuators 114, 115 are configured to move the display 113 the battery 112 vertically into opposite directions. The movements are illustrated by arrows.

Figure 2:
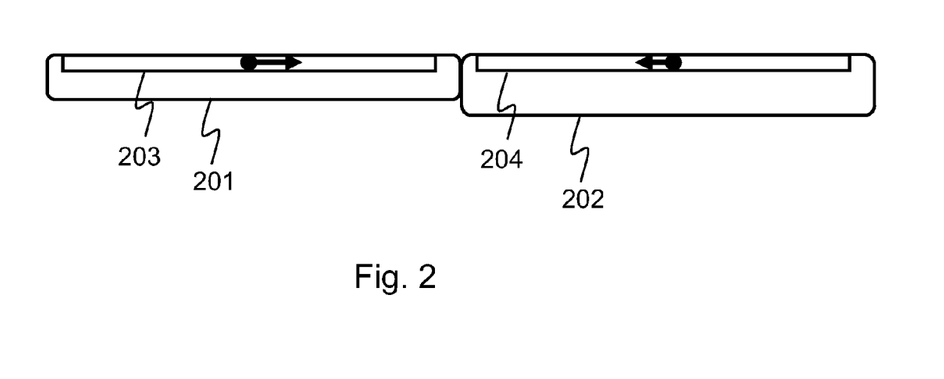
FIG. 2 shows an example of an apparatus of certain other embodiments of the invention.

FIG. 2 shows an example of an apparatus of certain other embodiments of the invention. The apparatus comprises two housing parts 201 and 202. Both housing parts 201, 202 comprise a display 203, 204. The displays 203, 204 are configured to move to opposite directions to counterbalance each other's movements. The movements are illustrated by arrows.

It must be noted that it is not mandatory to have two housing parts. Alternatively the two displays could be located in one housing part. Still further, there may be more than two displays.

Figure 3A:
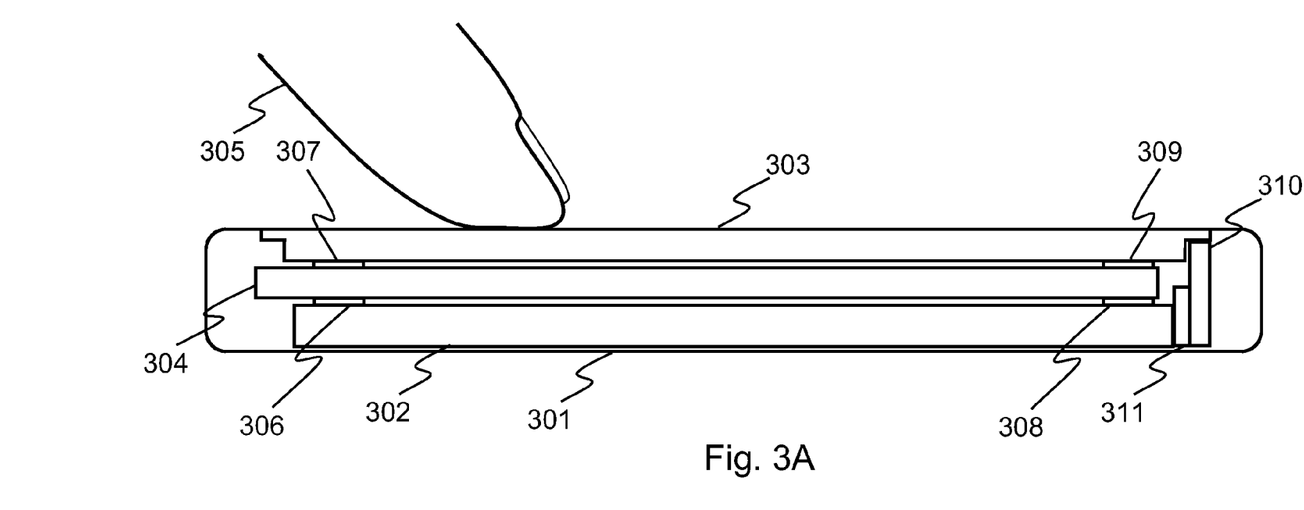
FIGS. 3A and 3B show a first mechanical implementation example according to an embodiment of the invention.
Figure 3B:
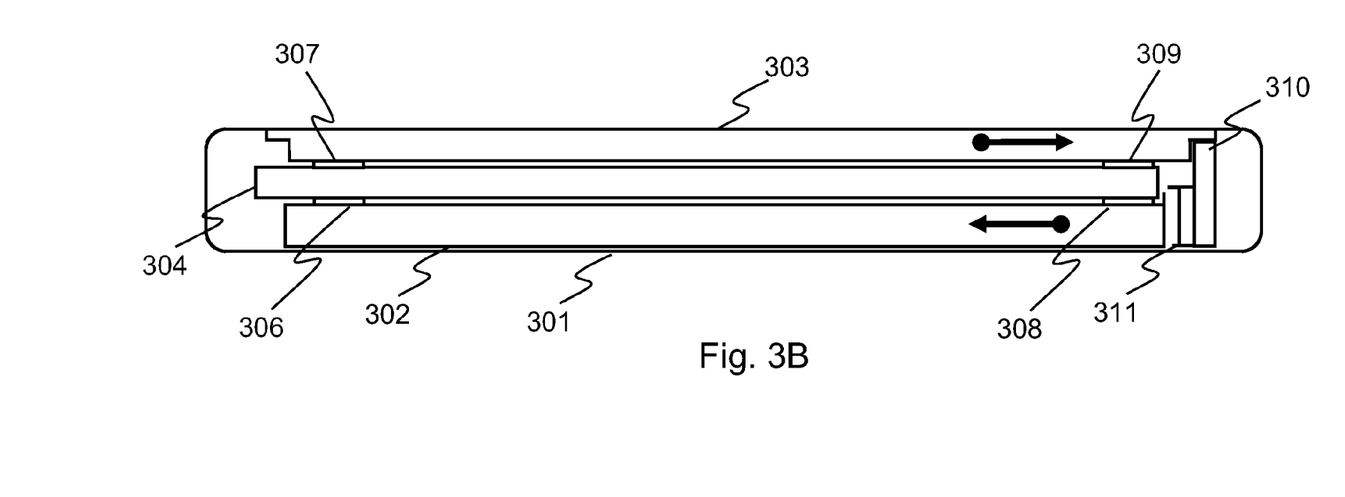

FIGS. 3A and 3B show a first mechanical implementation example according to an embodiment of the invention. FIGS. 3A and 3B show an apparatus 301, which comprises a battery 302 and a display module 303. Additionally, the apparatus comprises a connection rod 310, an actuator 311 (e.g. a piezo), a support structure/apparatus chassis 304, and sliding pads or gaskets 306-309. The connection rod 311 and the actuator 310 operatively connect the display 303 and the battery 302 to each other from one end of the display 303 and the battery 302. The sliding pads 306-309 are located between the support structure/apparatus chassis 304 and the display 303 and between the support structure/apparatus chassis 304 and the battery 302 so that the display 303 and the battery 302 may slide or move in relation to the support structure/apparatus chassis 304 along the sliding pads 306-309. The actuator 311 may be connected to the battery 302 and/or the connection rod 310 for example by using an adhesive tape (not shown). The connection rod 310 may be a support structure of any suitable form.

FIG. 3A shows the actuator 311 in rest position, i.e. the display 303 and the battery 302 are not moving. Additionally FIG. 3A shows a finger 305 of a user touching the display 303.

FIG. 3B illustrates the movement of the display 303 and the battery 302, when the actuator 311 pushes (or bends, the bent part is shown with dashed line). The movement of the actuator is conveyed to the display through the connection rod 310. The battery 302 slides/moves to left and the display 303 slides/moves to the right. The movements are illustrated by arrows.

Figure 4:
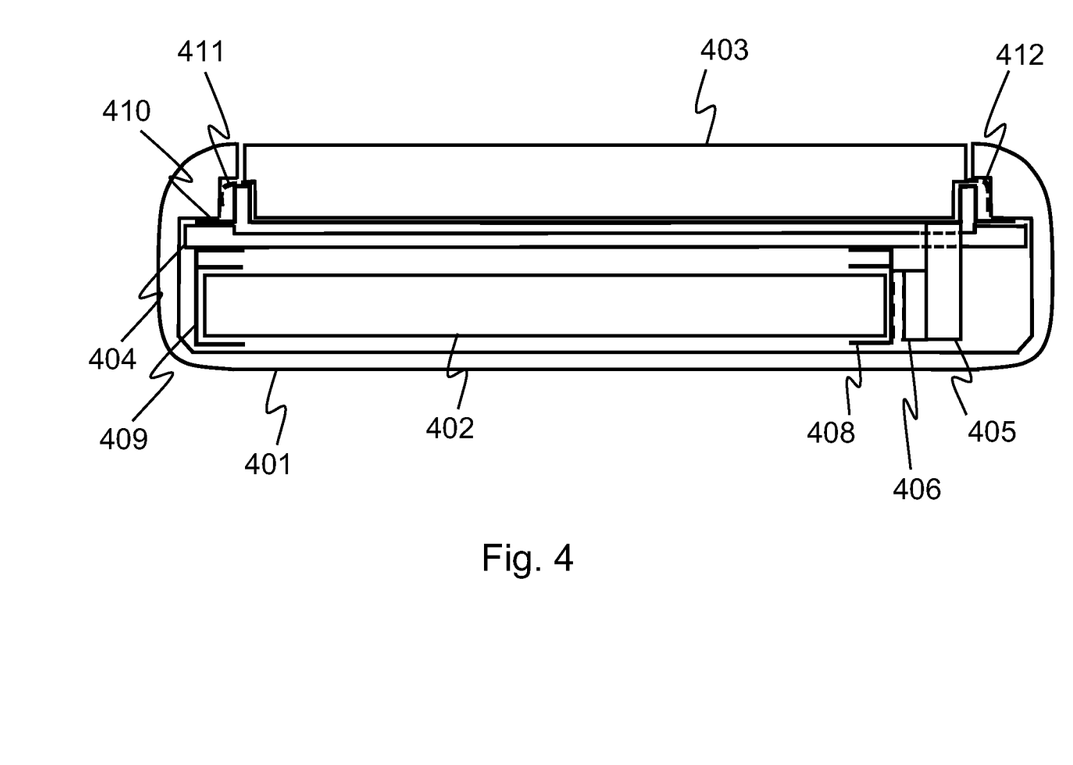
FIG. 4 shows a second mechanical implementation example according to an embodiment of the invention.

FIG. 4 shows a second mechanical implementation example according to an embodiment of the invention. FIG. 4 shows an apparatus 401, which comprises a battery 402 and a display module 403. Additionally, the apparatus comprises a connection rod 405, an actuator 406, a support structure/apparatus chassis 404, spring structures 408-410, and gaskets 411-412. The gaskets 411-412 protect the apparatus from external materials such as dust and moisture. The spring structures 408-410 are located between the support structure/apparatus chassis 404 and the display 403 and between the support structure/apparatus chassis 404 and the battery 402 so that the display 403 and the battery 402 may move in relation to the support structure/apparatus chassis 404 in guidance of the spring structures 408-410. In this way, the display 403 and the battery 402 are operatively coupled to the support structure/apparatus chassis 404 through the spring structures 408-410. Thereby, the display 403 and the battery 402 form a spring/mass-vibrators with the spring structures 408/410. The actuator 406 is operatively coupled between these two spring/mass-vibrators. The connection rod 405 and the actuator 406 operatively connect the display 403 and the battery 402 to each other from one end.

Center point of the actuator 406 is operatively connected to the display 403 through the connection rod 405 and the spring structure 410. The ends of the actuator 406 are operatively connected to the battery 402 through the spring structure 408.

The actuator 406 may be connected to the spring structure 408 and/or the connection rod 405 for example by using an adhesive tape (not shown). The connection rod 405 may be a support structure of any suitable form.

The spring structures of FIG. 4 may be made of a metal (e.g. steel).

Figure 5:
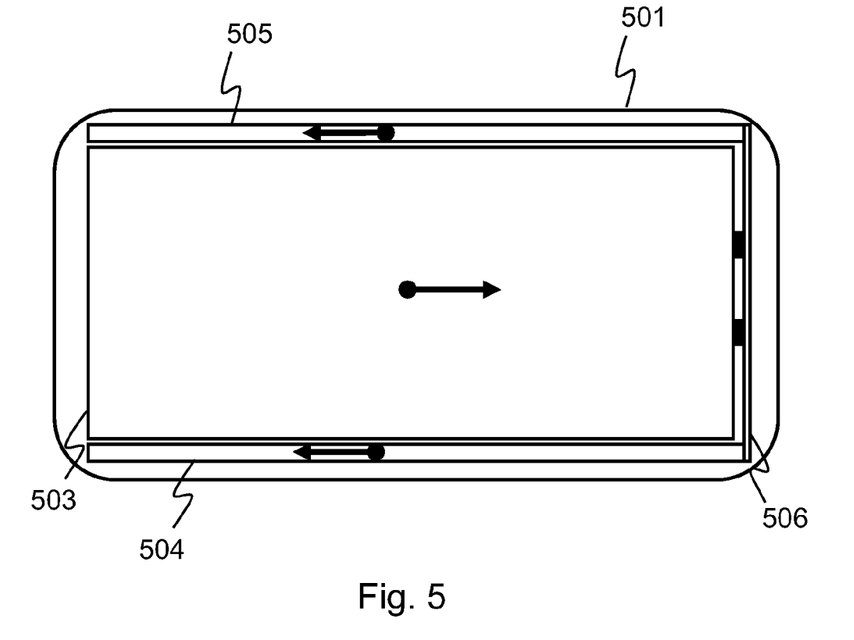
FIG. 5 shows a third mechanical implementation example according to an embodiment of the invention.

FIG. 5 shows a third mechanical implementation example according to an embodiment of the invention. FIG. 5 shows an apparatus 501, which comprises a display module 503, and counter weights 504 and 505 located on two sides of the display. Additionally, the apparatus comprises an actuator 506. The actuator 506 operatively connects the display 503 and the counter weights 504, 505 to each other from one end of the display 503 and the counter weights 504, 505.

When the actuator 506 is activated the display 503 moves to one direction and the counter weights 504, 505 move to an opposite direction. The movements are illustrated by arrows.

It must be noted that in the embodiment of FIG. 5, it is possible to use spring structures in a similar manner as disclosed in connection with FIG. 4. That is, the display module 503 and the counter weights 504, 505 may be coupled to apparatus chassis using spring structures.

Figure 6:
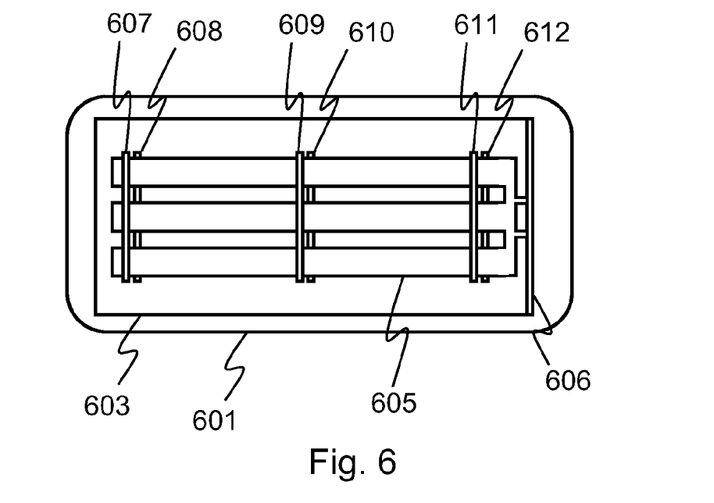
FIG. 6 shows a fourth mechanical implementation example according to an embodiment of the invention.

FIG. 6 shows a fourth mechanical implementation example according to an embodiment of the invention. FIG. 6 shows an apparatus 601, which comprises a display module 603 and a thin counter weight 605 located under the display module 503. Additionally, the apparatus comprises an actuator 606, and sliding tapes 607-612. The actuator 606 operatively connects the display 603 and the counter weight 605 to each other from one end of the display 603 and the counter weight 605. The counter weight 605 may slide or move along the sliding tapes 607-612.

When the actuator 606 is activated the display 603 moves to one direction and the counter weight 605 moves to an opposite direction. Also in this embodiment it is possible to employ spring structures.

Figure 7:
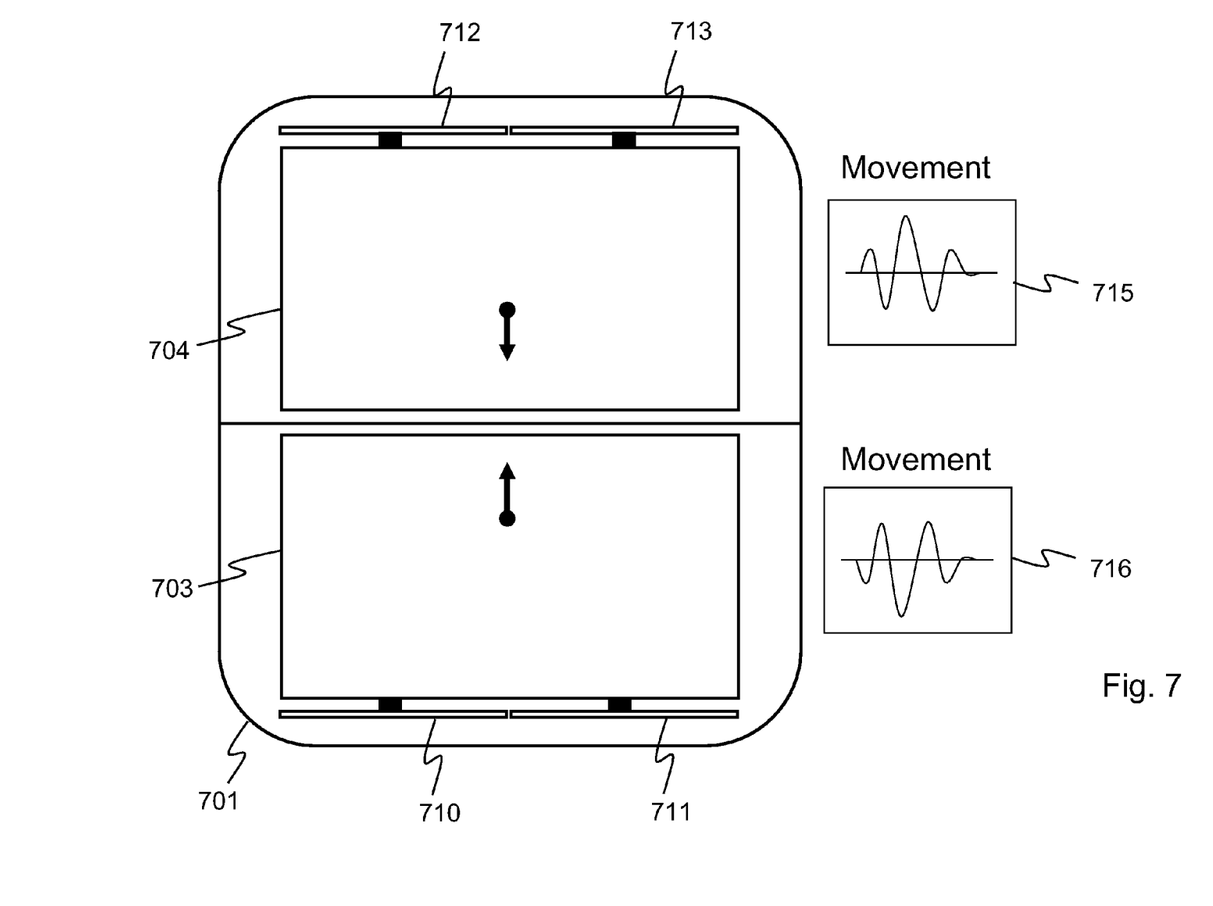
FIG. 7 shows a fifth mechanical implementation example according to an of the invention.

FIG. 7 shows a fifth mechanical implementation example according to an of the invention. FIG. 7 shows an apparatus 701, which comprises a first display module 703 and a second display module 704. Additionally, the apparatus comprises actuators 710-713. The actuators 710-713 are configured to move the first display 703 and the second display 704 to opposite directions, when the actuators 710-713 are activated.

The movements of the displays are illustrated by arrows. Additionally, diagrams 715 and 716 illustrate an example of movements of the displays 703 and 704, respectively. From the diagrams it can be seen that the displays 703, 704 move to opposite directions.

It must be noted that in the embodiment of FIG. 7, it is possible to use spring structures in a similar manner as disclosed in connection with FIG. 4. That is, the display modules 703 and 704 may be coupled to apparatus chassis using spring structures.

Figure 8:
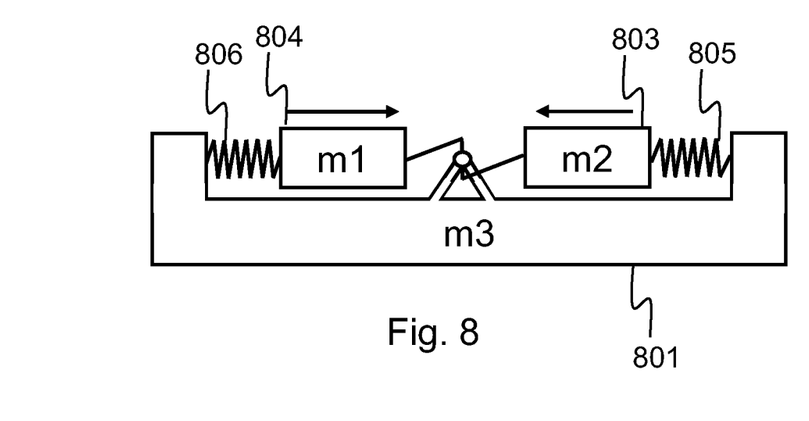
FIG. 8 illustrates a model according to an embodiment of the invention.

FIG. 8 illustrates a model according to an embodiment of the invention. The model comprises an apparatus chassis 801 having weight m3, movably mounted elements 803 and 804 having weights m2 and m1, respectively. The movably mounted elements 803 and 804 are coupled to the chassis 801 from one end through spring structures 805 and 806, respectively. From the other ends the movably mounted elements 803 and 804 are operatively coupled to each other and to the chassis 801. The movably mounted elements are configured to move to opposite directions, whereby they cancel out the movements of each other and the chassis 801 may remain relatively stable.

Figure 9:
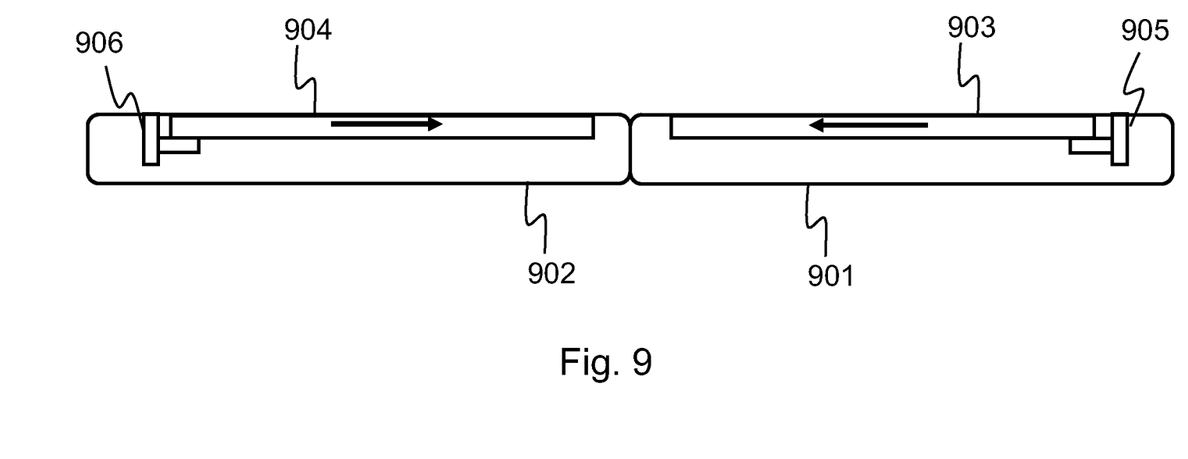
FIG. 9 shows a sixth mechanical implementation according to an embodiment of the invention.

FIG. 9 shows a sixth mechanical implementation according to an embodiment of the invention. FIG. 9 shows an apparatus comprising two housing parts 901 and 902. Both housing parts 901, 902 comprise a display 903, 904 and an actuator 905, 906. The actuators 905, 906 are configured to move the displays 903, 904 to opposite directions. The movements are illustrated by arrows. Also in this embodiment it is possible to employ spring structures.

Figure 10:
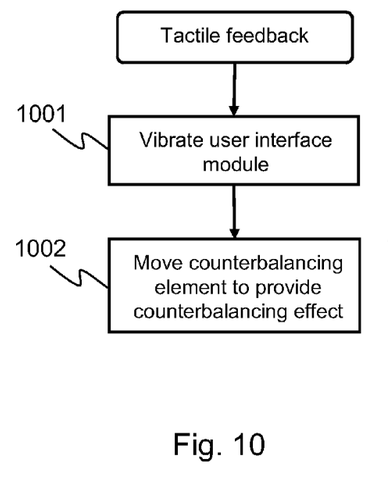
FIG. 10 is a flow chart illustrating a method of an embodiment of the invention.

FIG. 10 is a flow chart illustrating a method of an embodiment of the invention. The method provides tactile feedback in an electronic apparatus. In phase 1001, a user interface module is vibrated and in phase 1002 a counterbalancing element is moved so as to provide counterbalancing effect to the vibration of the user interface module.

Figure 11:
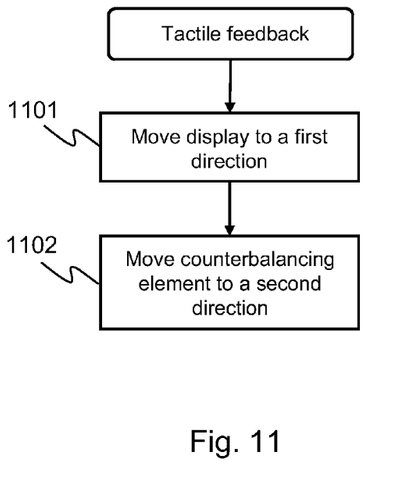
FIG. 11 is a flow chart illustrating a method of another embodiment of the invention.

FIG. 11 is a flow chart illustrating a method of another embodiment of the invention. The method provides tactile feedback in an electronic apparatus. In phase 1101, a display is moved to a first direction and in phase 1102 a counterbalancing element is moved to a second direction. In this way the movements of the display and the counterbalancing element counterbalance movements of each other.

Figure 12:
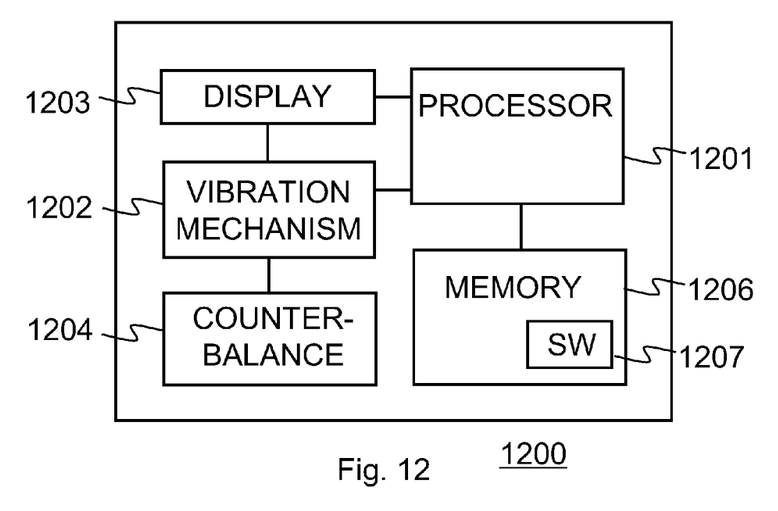
FIG. 12 shows a block diagram of an apparatus according to an example embodiment of the invention.

FIG. 12 shows a block diagram of an apparatus 1200 according to an example embodiment of the invention. The apparatus may be for example a mobile phone, a smart phone, a tablet pc, or some other portable electronic device.

The apparatus 1200 a physically tangible object and comprises a vibration mechanism 1202, a display 1203 and a counterbalance element 1204. The apparatus 1200 further comprises at least one memory 1206 configured to store computer program code (or software) 1207, and at least one processor 1201 for controlling at least some part of the operation of the apparatus 1200 using the computer program code 1207.

The at least one processor 1201 may be a master control unit (MCU). Alternatively, the at least one processor 1201 may be a microprocessor, a digital signal processor (DSP), an application specific integrated circuit (ASIC), a field programmable gate array, a microcontroller or a combination of such elements. FIG. 12 shows one processor 1201, but the apparatus 40 may comprise a plurality of processors 1201. The at least one memory 1206 may be, for example, random access memory, flash memory, hard disk, hard disk array, optical storage, memory stick, memory card and/or magnetic memory.

The vibration mechanism 1202 may comprise one or more piezo actuators and/or one or more spring structures. The display 1203 may be a touch screen. In an embodiment of the invention the display 1203 may be replaced by some other user interface element. The counterbalance element 1204 may be another display, or a battery, or general purpose counter weight, or some other suitable movable element.

The processor 1201 is configured to control the vibration mechanism 1202 to provide vibration effect and the vibration mechanism 1202 is configured to provide the vibration effect by moving the display 1203 and the counterbalance element 1204. In an embodiment of the invention the vibration mechanism is configured to move the display 1203 and the counterbalance element 1204 such that the movements of the display 1203 and the counterbalance element 1204 counterbalance each other so as to maintain chassis of the apparatus substantially stable.

A skilled person appreciates that in addition to the elements shown in FIG. 12, the apparatus 1200 may comprise other elements, such as user interfaces, further displays, as well as communication units, and other additional circuitry such as input/output (I/O) circuitry, memory chips, and the like. A communication unit included in the apparatus may be for example a radio interface module, such as a WLAN, Bluetooth, GSM/GPRS, CDMA, WCDMA, or LTE radio module. Such communication unit may be integrated into the apparatus 1200 or into an adapter, card or the like that may be inserted into a suitable slot or port of the apparatus 1200. The communication unit may support one radio interface technology or a plurality of technologies and there may be one or more such communication units.

In an example embodiment of the invention the display 1203, the vibration mechanism 1202 and the counterbalance element 1204 of FIG. 12 are integrated into a user interface module (not shown).

By means of using the counterbalancing effect according to various embodiments of the invention one may reduce undesired movement of an apparatus chassis. This results in improved localized haptic effect/feedback and thus improves user experience. By using the counterbalancing effect this can be achieved without substantially increasing apparatus size or weight.

In an embodiment of the invention both vibrating elements, i.e. the user interface module and the counterbalancing element, can be configured to move to the same direction in addition to having them move to opposite directions. For example, there may be two different operating modes. When the user interface module and the counterbalancing element move to the same direction their movements reinforce each other, which will vibrate the whole apparatus. In an example embodiment of the invention both vibrating elements have their own vibrating mechanism (e.g. piezo) and vibration to the same direction or to the opposite directions is provided by altering polarity of the driving signals of the vibrating mechanisms.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:

1. An apparatus comprising:
a user interface module,
a chassis,
a vibration mechanism configured to move the user interface module to provide a localized tactile effect through the user interface module, and
a counterbalancing element configured to provide a counterbalancing effect for movements of the user interface module, the counterbalancing effect being configured to reduce movement of the chassis of the apparatus during vibrating movements of the user interface module providing the localized tactile effect through the user interface module.

2. The apparatus of claim 1, wherein the user interface module is a display.

3. The apparatus of claim 1, wherein the counterbalancing element is a battery.

4. The apparatus of claim 2, wherein the counterbalancing element is a second display.

5. The apparatus of claim 1, wherein the counterbalancing element is configured to provide the counterbalancing effect by moving to an opposite direction relative to a movement of the user interface module.

6. The apparatus of claim 1, wherein the vibration mechanism comprises a piezo actuator.

7. The apparatus of claim 1, wherein the vibration mechanism comprises a spring structure.

8. The apparatus of claim 1, wherein the counterbalancing element and the user interface module are mechanically connected to each other.

9. The apparatus of claim 1, wherein a movement of the user interface module to a first direction is configured to cause movement of the counterbalancing element to a second direction, wherein the first direction and the second direction are opposite directions.

10. The apparatus of claim 1, wherein the vibration mechanism is configured to move the counterbalancing element to provide the counterbalancing effect.

11. The apparatus of claim 1, wherein the vibration mechanism is configured to push the user interface module to a first direction and the counterbalancing element to a second direction, wherein the first direction and the second direction are opposite directions.

12. A method comprising:
providing a localized tactile effect through a user interface module of an apparatus by vibrating the user interface module, and
providing a counterbalancing effect for vibrating movements of the user interface module by causing movements of a counterbalancing element, the movements of the counterbalancing element reducing movement of a chassis of the apparatus during vibrating movements of the user interface module providing the localized tactile effect through the user interface module.

13. The method of claim 12, further comprising:
pushing the user interface module to a first direction and pushing the counterbalancing element to a second direction, wherein the first direction and the second direction are opposite directions.

14. The method of claim 12, wherein a movement of the user interface module to a first direction causes movement of the counterbalancing element to a second direction, wherein the first direction and the second direction are opposite directions.

15. A computer program product comprising a non-transitory computer readable storage medium having computer executable program code stored thereon which, when executed by at least one processor of an apparatus, causes the apparatus to perform:
providing a localized tactile effect through a user interface module of the apparatus by vibrating the user interface module, and
providing a counterbalancing effect for movements of the user interface module by moving a counterbalancing element, the movements of the counterbalancing element reducing movement of a chassis of the apparatus during vibrating movements of the user interface module providing the localized tactile effect through the user interface module.

* * * * *